Patented Aug. 20, 1929.

1,725,583

UNITED STATES PATENT OFFICE.

LLEWELLYN JOHN HOWELLS, OF KEW, VICTORIA, AUSTRALIA.

MANUFACTURE OF YEAST.

No Drawing. Application filed February 20, 1925, Serial No. 10,689, and in Australia March 3, 1924.

This invention relates to improvements in the manufacture of yeast by fermentation.

Hitherto, the manufacture of yeast has been effected by sowing a certain quantity of seed yeast into a mash or wort derived from vegetable matter, such as malt, with the addition in some cases of other substances, such as molasses, ammonia and the like, the action being assisted by aeration.

It has been found that, as the yeast propagates in the mash or wort, the latter becomes continuously poorer in nutritive substances caused partly by the consumption of the said nutritive substances by the yeast itself and also on account of the dilution by additions of washing water.

It has recently been proposed to improve the manufacture of yeast by dividing the filtrates or worts thereto into two portions and initiating the propagation of the yeast in the weaker portion of the filtrate or wort and adding the stronger portion of the filtrate or wort as fermentation proceeds.

In carrying out this latter process, the additions of the stronger portion of the filtrate or wort are made practically at a uniform rate and in consequence it has been found necessary to prepare a mash of such a nature that the amount of fermentable carbohydrate such as sugar, supplied bears a ratio to the amount of assimilable nitrogen of not less than 36 to 1. If this ratio of fermentable carbohydrate or sugar to nitrogen is allowed to fall below this figure (36 to 1) it has been found that the whole of the assimilable nitrogen is not absorbed, resulting in waste.

From experiments which I have conducted, I have found that the rate of growth of the yeast is determined by the concentration of the yeast cells. Under the conditions above set forth (viz, when the additions of the stronger portion of the filtrate or wort are made at a uniform rate) in the earlier stages of the fermentation, there is an excessive amount of nutriment present and the concentration of the yeast cells is comparatively low, with a relatively slow rate of growth of yeast, so that the rate at which the nitrogen is assimilated is correspondingly low.

I have also found that under the above conditions (that is when the additions of the stronger portion of the filtrate or wort are made at a uniform rate) the rate of fermentation is different to the rate of growth and that in the earlier stages of fermentation practically the whole of the fermentable carbohydrate is acted upon, whereas only a portion of the assimilable nitrogen is absorbed, and, further, that the ratio of the rate of consumption of the fermentable carbohydrate to that of the nitrogen is considerably in excess of 36 to 1.

As the fermentation proceeds this ratio falls and may eventually become as low as 18 to 1, but under these conditions the average ratio of the consumption of the fermentable carbohydrate to the nitrogen taken over the whole fermentation cannot be reduced below 36 to 1.

Now, the object of this invention is to provide certain improvements in the manufacture of yeast whereby greater efficiency is obtained and a larger quantity of yeast obtained from a mash of a given amount of vegetable matter (such as malt) together with other added substances such as fermentable carbohydrate and nitrogen bearing compounds.

I accomplish this object by providing a process for the manufacture of yeast in which the propagating yeast is supplied with only just sufficient fermentable carbohydrate to enable the yeast to assimilate the whole of the assimilable nitrogen as it becomes available.

This invention, therefore, comprises the regulation and adjustment of the additions to the fermenting vessel whereby the amount of fermentable carbohydrate present is such as to maintain the necessary ratio for the most efficient production of yeast. This condition is obtained by regulating the addition of the stronger wort during fermentation in accordance with the rate of the growth of the yeast in the presence of sufficient nutriment.

I have investigated the rate of growth and found it to be as follows: For two hours after the addition of seed yeast very little growth occurs; after that, the quantity of yeast present at the end of any hour is equal to the quantity present at the beginning of the hour, multiplied by a constant factor which I call "p". It is assumed that the conditions, viz, the intensity of aeration, the concentration of the worts and the temperature, are kept constant, and a sufficient supply of nutriment is furnished, This rate of growth is maintained until either the whole of the fermentable carbohydrate or the whole of the assimilable nitrogen is consumed. I have further discovered that, under the usual conditions of fermentation, the above factor "p" amounts to 1.26 and, therefore, that maximum efficiency is obtained when the additions of the strong wort are commenced at two hours after the introduction of the seed yeast at such a rate that, during the first hour, the amount of fermentable carbohydrate supplied is 12% of the weight of seed yeast and the amount of fermentable carbohydrate for each successive hour is 1.26 times the amount supplied during the preceding hour. If this rate is exceeded, as is the case in the earlier stages of known processes, waste of fermentable carbohydrates occurs; if the rate is slower, the fermentation is prolonged. It is, however, advisable to employ a slightly slower rate based on a factor, say 1.2, so that, whilst the fermentation is not unduly prolonged, the ill effect of accidental variations in the rate of addition are minimized if not eliminated.

In adapting this invention to the known processes for the manufacture of yeast wherein the whole of the raw materials are mixed in one mash tun to provide wort, the extract of which is of uniform composition (in which the ratio of fermentable sugar to assimilable nitrogen is fixed), the selection of raw materials is such that the ratio of fermentable carbohydrate to assimilable nitrogen is 18 to 1, or thereabouts. Fermentation is initiated by adding sufficient amount of seed yeast in accordance with the amount of yeast to be produced (calculated from the factor "p" as above) and the different conditions such as aeration, dilution, additions of strong filtrate or wort, or regulated and controlled in accordance with the rate of growth of the yeast as above set out.

In applying this invention, a mash was made in the usual way and filtered, producing a wort in which the ratio of fermentable carbohydrate to assimilable nitrogen was 17.5 to 1. This filtrate was divided into two portions A and B, portion A containing 95% of the extract and portion B the remainder. Fermentation was initiated in portion B by the addition of a certain amount of seed yeast, aeration and temperatures (about 85° F) being maintained as in known processes. Two hours after the additions of the seed yeast Portion A was introduced to the fermenting vessel at a constantly increasing rate over a period of twelve hours, so that the amount added during any hour is 1.2 times the amount added during the preceding hour.

Two hours after the cessation of additions the yeast crop was separated and pressed in the ordinary way.

Another way of carrying this invention into effect is to divide the raw materials into two separate parts and to mash each separately so as to provide two separate worts, one having a high value for the ratio of fermentable carbohydrate to assimilable nitrogen and the other a low value for the ratio of fermentable carbohydrate to assimilable nitrogen. By mixing these two worts in varying portions the average value of this ratio for the fermentation may be varied at will during the progress of the fermentation in accordance with the usual tests which are made from time to time.

With regard to the use of the term "assimilable nitrogen" it will be understood that references to nitrogen in the specification are intended to mean the element nitrogen and the quantitative references to assimilable nitrogen mean that quantity or amount of nitrogen (calculated as elementary nitrogen) which is assimilated into the yeast during fermentation and is represented by the total quantity in the yeast product less the amount in the seed yeast added for the purposes of initiating fermentation. The amount of assimilable nitrogen can only be ascertained by test experiments with any particular raw material when a sufficient amount of fermentable carbohydrate (as determined by preliminary test experiments) is added to produce the maximum assimilation of nitrogen. It is to be understood that the quantitative references to nitrogen in the specification are as to elementary nitrogen.

I claim:—

1. In the propagation of yeast, making periodic additions of yeast nutriment containing yeast fermentable carbohydrate, and yeast assimilable nitrogenous substances produced respectively from carbohydrate and protein from a vegetable source, to raw material, in which a yeast propagation is progressing, under such conditions that the amount of yeast fermentable carbohydrate supplied by said additions during any period is that of the previous equal period multiplied by a constant factor, the carbon in yeast-assimilable form in the added wort being the only carbon in yeast-assimilable form added to the raw material.

2. In the propogation of yeast, making periodic additions of yeast nutriment containing yeast fermentable carbohydrate, and yeast assimilable nitrogenous substances produced respectively from carbohydrate and protein from a vegetable source, to raw material, in which a yeast propagation is progressing, under such conditions that the amount of yeast fermentable carbohydrate supplied by said additions during any period is that of the previous equal period multiplied by about 1.26, the carbon in yeast-assimilable form in the added wort being the only carbon in yeast-assimilable form added to the raw material.

3. A process for the propagation of yeast, comprising producing a yeast propagation wort containing yeast fermentable carbohydrate in which the ratio of yeast fermentable carbohydrate to yeast assimilable nitrogen is approximately 17.5 to 1, dividing the wort produced into a portion A and a portion B, adding seed yeast to the portion B and proceeding with the yeast propagation therein for approximately two hours, then adding quantities of the portion A at such a rate that the amount added each hour is substantially equal to the amount added during each preceding hour multiplied by 1.26, maintaining intense aeration during the whole period of propagation and maintaining the temperature at about 85° F.

4. A method for the propagation of yeast, comprising the dividing of a quantity of yeast fermentable material into two separate parts and washing each part separately to produce two separate worts A and B, A having a high ratio of yeast fermentable carbohydrate to yeast assimilable nitrogen, and B a low ratio of yeast fermentable carbohydrate to yeast assimilable nitrogen, proceeding with the yeast propagation of the wort B with additions of seed yeast and adding portions of wort A in such quantities that the yeast is constantly supplied with only just sufficient yeast fermentable carbohydrate to maintain unrestricted growth, maintaining intense aeration during the whole period of yeast propagation, and maintaining the temperature at about 85° F.

LLEWELLYN JOHN HOWELLS.